Aug. 26, 1952 W. E. McKIM 2,608,021
RODENT TRAP
Filed Aug. 14, 1950 2 SHEETS—SHEET 1
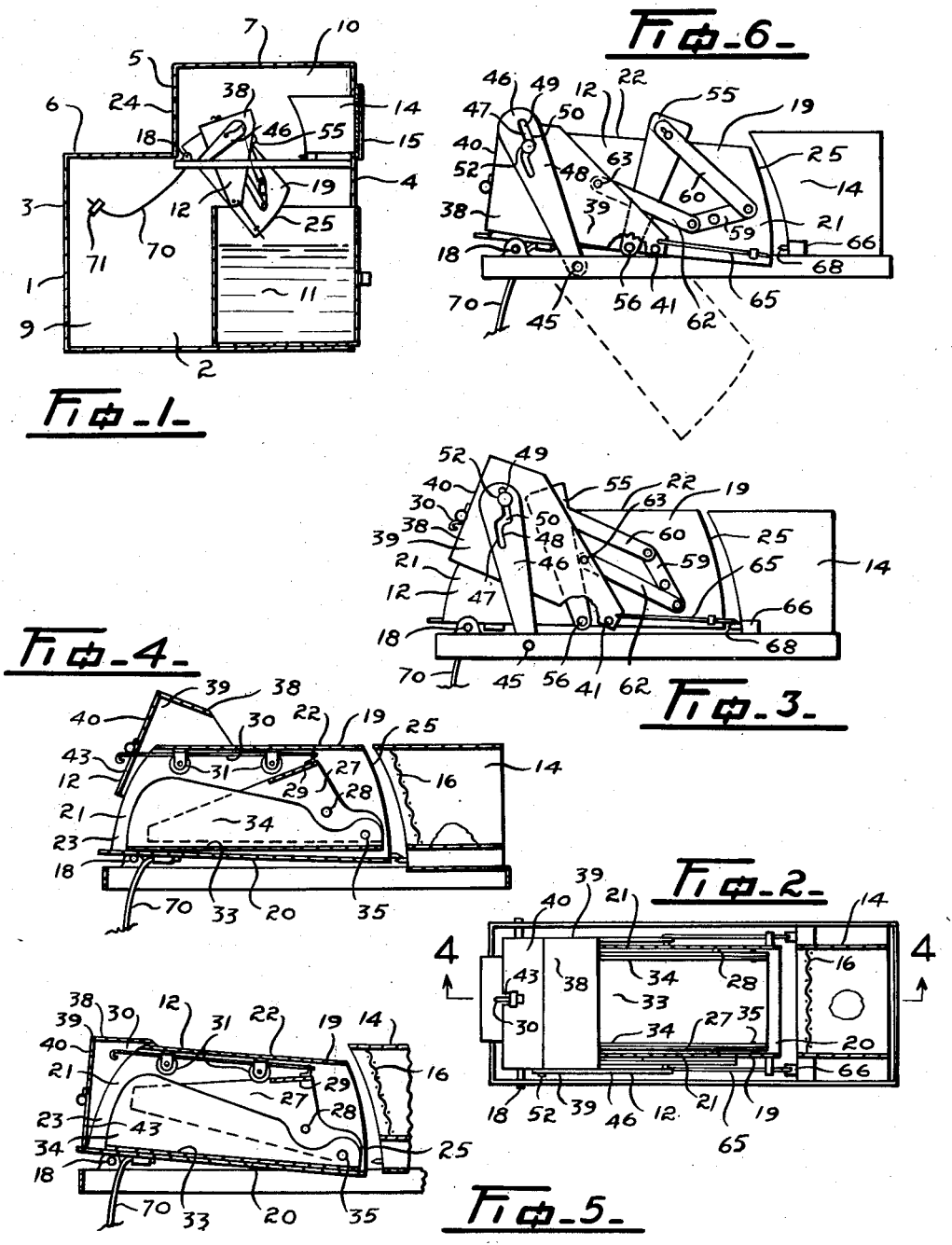
INVENTOR
WALTER EARL McKIM
Ernest E Carver
ATTORNEY Aug. 26, 1952     W. E. McKIM     2,608,021
RODENT TRAP
Filed Aug. 14, 1950     2 SHEETS—SHEET 2
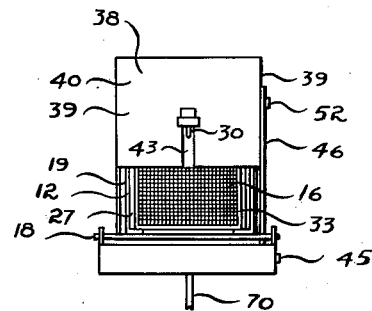
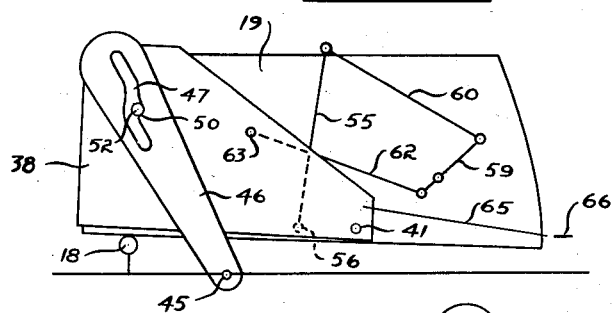
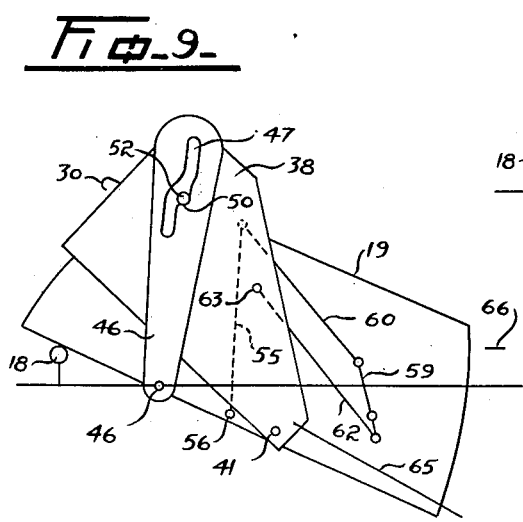
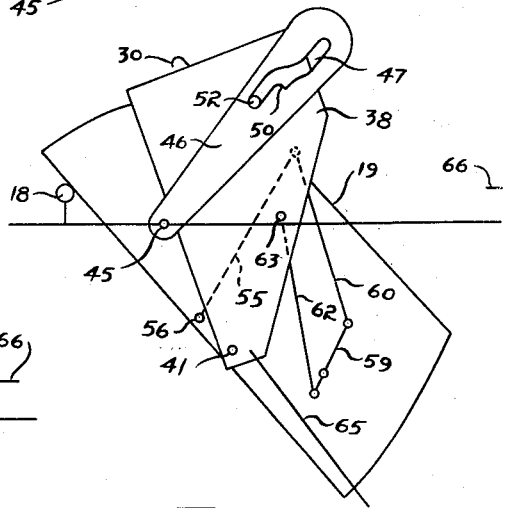
INVENTOR
WALTER EARL McKIM
ATTORNEY Patented Aug. 26, 1952

2,608,021

UNITED STATES PATENT OFFICE 2,608,021

RODENT TRAP

Walter Earl McKim, White Rock, British Columbia, Canada

Application August 14, 1950, Serial No. 179,317

3 Claims. (Cl. 43—76)

My invention relates to improvements in rodent traps of the self-setting type.

The objects of the present invention are to provide a self-setting trap of substantial size and strength suitable for permanent use where rodents, particularly rats, are found, such as warehouses, restaurants etc.; to provide means whereby the entrance to the trap is closed behind an incoming animal before he reaches the bait, and to provide that the animal shall be dropped into a suitable receptacle for extermination as he gets close to the bait. Still further objects are to prevent the animal from reaching the bait provided for his enticement, and to provide free air passage through the entrance, so that the smell of the bait will be sensed throughout the length of said entrance.

Referring to the drawings:

Figure 1 is a longitudinal sectional view of the trap with the trap mechanism at maximum position of tilt.

Figure 2 is a sectional plan view of the mechanism.

Figure 3 is a side elevational view of the mechanism when in "set" position.

Figure 4 is a sectional view taken on the line 4—4 of Figure 2, showing the mechanism in set position.

Figure 5 is a similar view as Figure 4 showing the mechanism released and about to tip.

Figure 6 is a side elevation of the mechanism when about to tip.

Figure 7 is a front elevational view of the invention when in "set position."

Figure 8 is a diagrammatic view of one side of the invention showing the disposition of the weighted arm immediately following the springing of the trap.

Figure 9 is a similar view showing the disposition of said weighted arm when the tunnel is in medial position of its downward travel.

Figure 10 is a view showing the arms position with the tunnel at the bottom of its stroke.

In the drawings like characters of reference indicate corresponding parts in each figure.

The numeral 1 indicates generally a casing having side walls 2, one only shown, end walls 3 and 4, an intermediate wall 5 and covers 6 and 7. The casing is divided into lower and upper chambers 9 and 10 and a removable open topped water tank 11 is housed within the lower chamber. Above the water tank 11, the trap mechanism 12 forming the invention generally, is housed and forming part of said mechanism is a stationary bait box 14 having a grille covered opening 15 in the wall 4 and preferably a foraminous screen 16 adjacent the inner end to prevent a trapped rodent from reaching the bait placed therein.

Pivotally mounted on a transverse pivot 18 is a tunnel 19 having a floor 20, side walls 21 and a top wall 22. The entrance to the tunnel is indicated by the numeral 23 and is normally facing an opening 24 formed in the intermediate wall 5 of the casing 1. The outlet 25 is arcuately shaped to conform to the inner end of the bait box 14 and to allow the tunnel to swing downwardly into the lower chamber 9 as shown in Figure 1. Mounted upon the inner face of each side wall 21 of the tunnel is a substantially triangular plate 27 which has a slight pivotal movement about a pivot pin 28 carried by said side wall. These plates are connected together by a transverse member 29 and a gate latch bolt 30 is hingedly connected to said member which extends over guides or rollers 31 and projects beyond the entrance end of the tunnel. The rollers 31 are affixed to the underside of the top wall 22 of said tunnel. From the lower corners of the triangular plates a runway 33 having side walls 34 is pivotally mounted as at 35, so that the weight of the runway and an animal of appropriate size will cause the inner end of the triangular plates to lift and the latch bolt 30 to be withdrawn to the right. The triangular plates 27 are so fulcrumed as to cause the outer end of the runway 33 to be normally elevated above the surface of the floor 20. It will be noted that the swinging movement of the runway will be stopped when said runway rests upon the floor 20 of the tunnel.

A hood 38 having side plates 39 and a front gate 40 is hingedly mounted upon pivot pins 41 which are carried by the side walls of the tunnel. The gate of the hood is provided with an opening 43 through which the latch bolt 30 is adapted to extend when the trap mechanism is in the position shown in Figure 4 to support said gate in open position relative to the tunnel as shown in Figure 4. Mounted upon a pin 45 below and to the right of the transverse pivot 18 is a swinging arm 46 having a slot 47 in its upper end. The slot has a lower part 48 and an upper part 49 which are relatively offset to provide a step 50 intermediate the parts. A latch pin 52 extends from a side of the hood 38 and through the slot 47 of the swinging arm 46, with the pin remaining in the upper part 49 of the slot above the step 50 when the trap is in set position as in Figure 3.

A weight arm 55 is pivoted at its lower end upon a pin 56 which extends from a side wall of the tunnel 19. The weight arm 55 is rocked through a lever 59 which is pivotally mounted upon a side wall of the tunnel and a connecting link 60 connected to the weight arm and to the upper end of the lever 59. The lower end of the lever 59 is connected to a side plate 39 of the hood 38 by a link 62 having an anchor pin 63 connected to the hood 38, whereby as the tunnel drops to its lowermost position, as shown in Figure 1 and subsequent to trapping a rodent, the rear end of the hood drops also, causing said hood to pivot upon the pin 52 on the step 50 of the swinging arm 46 and its weight to be carried over well to the right of the runway pivot 18, so that the thrust of the link 62 through the lever 59 and the link 60 will swing the weighted arm 55 a lesser degree in an anti-clockwise direction than the swinging arm 46 swings to the right. A latch rod 65 is connected to the side wall of the hood 38 which is adapted to engage the upper surface of a spring projected retractile latch 66 having an inclined nose 68.

A curved rod 70 is fitted to the underside of the tunnel 19 which is adapted to swing in the lower chamber 9 of the casing and a counterweight 71 is adjustably secured upon said curved rod for the purpose of substantially balancing the several parts and to insure a proper return of the parts to normal position after dropping a trapped rodent into the water tank 11.

In use, bait is placed in the bait box 14 and the counterweight adjusted to conform to the general weight of rodent to be caught. As an animal walks in upon the runway 33 and gets his front feet close to its rear end, his weight will depress said runway, causing the plates 27 to rock about the pivots 28 in a clockwise direction, causing the latch bolt 30 to be withdrawn from the opening 43 and drop the gate to cover the entrance 23, also to withdraw the latch rod 65 and allow the tunnel 19 to swing in a clockwise direction. The dropping of the gate also causes the swinging arm 46 to move to the left as in Figure 6 until the pin 52 engages the step 50. As the free end of the tunnel drops, the rodent will slide downwardly along the runway 33 finally dropping therefrom. As soon as the runway is relieved of the rodent's weight the triangular plates 27 will rock in an anti-clockwise direction imparting an outward movement to the latch bolt 30. Simultaneously with the initial downward swing of the tunnel the upper end of the weight arm 55, which was in the position shown in Figure 6, will move to the left through the linkage 59, 60 and 62 and due to the arcuate movement of the pin 56 about the pin 18 its lower end will move in a like manner and the swinging arm 46 will swing beyond centre to the right as shown in Figure 10. The downward swing of the tunnel causes the gate to lift from the position shown in Figure 8 to the position shown in Figure 9 since the pin 52 is engaged upon the step 50 of the slot 47. As the tunnel swings still further, towards the position shown in Figure 10, the swing arm will fall to the right, withdrawing the step from under the pin, simultaneously with this movement, the rodent falling from the runway will allow said runway and the triangular plates to return to normal position, so that the latch bolt can project through the gate and support it in raised position during the return of the tunnel to horizontal position. The final upswing of the gate allows the pin 52 to assume a position at the lower part 48 of the slot 47 as the counterweight 71 starts to return the tunnel to horizontal position. On the return swing of the tunnel, the gate drops slightly with respect to the tunnel and as the tunnel comes to rest the pin 52 becomes located in the upper part of the slot above the step 50 as shown in Figure 6. Likewise with the return of the tunnel to horizontal position the latch 66 retracts to enable the latch rod 65 to resume its normal position and lock the tunnel against free swinging movement.

What I claim as my invention is:

1. A rodent trap comprising a casing, a normally horizontally balanced tunnel mounted on a transverse pivot carried by the casing, a runway depressibly mounted within the tunnel, a gate hingedly hung from the tunnel adapted to close an end of said tunnel in response to a rodent getting onto said runway and causing it to move relative to the tunnel, a latch bolt for holding the gate in open position, a latch rod for retaining the tunnel in horizontal position, means actuated by the movement of the runway for releasing the latch rod to permit the tunnel and the runway to tilt downwards to discharge the rodent, and means hinged to the casing for arresting the movement of the gate when closing in response to downward movement of the runway, said runway being operably coupled to move the latch bolt to lock the gate in open position in response to upward movement of the runway.

2. A rodent trap comprising a casing, a normally horizontally balanced tunnel mounted on a transverse pivot carried by the casing, a runway depressibly mounted within the tunnel, a gate hingedly hung from the tunnel adapted to close an end of said tunnel in response to a rodent getting onto said runway and causing it to move downwards relative to the tunnel, a latch for retaining the tunnel in horizontal position, means actuated by the movement of the runway for releasing the latch to permit the tunnel and the runway to tilt downwards to discharge the rodent, a swinging arm hinged to the casing for moving the gate towards one position when the runway is relieved of its live load, a latch bolt movable in response to return movement of the runway for latching the gate in open position before said tunnel has completed its downward swing, and a weighted member having one swinging movement about a fixed point adapted to accelerate the downward swinging movement of the tunnel when a rodent is entrapped therein and a second swinging movement to assist the tunnel to return to normal position subsequent to the discharge of the rodent from said tunnel.

3. A rodent trap comprising a casing, a normally horizontally balanced tunnel mounted on a transverse pivot carried by the casing, a pair of plates rockingly mounted in the tunnel, a runway pivotally mounted between said plates and adapted to be depressed, a gate pivotally mounted on the tunnel adapted to close an end of said tunnel in response to a rodent getting onto said runway and causing it to move relative to the tunnel, a latch for retaining the tunnel in horizontal position, a weight arm pivotally mounted from the tunnel and connected to the gate by a link and rocking lever having movement adapted to swing away from the transverse pivot when the runway supports a rodent and to swing towards said pivot when said rodent is discharged from the tunnel, means actuated by the runway for releasing the tunnel to swing downwards, and a latch bolt connected to one of the plates adapted to engage the gate to hold it in open position as the runway returns to normal position relative to the tunnel.

WALTER EARL McKIM.

REFERENCES CITED

The following references are of record in the file of this patent:

UNITED STATES PATENTS

| Number | Name | Date |
|---|---|---|
| 450,176 | Merrell | Apr. 14, 1891 |
| 1,180,654 | Kirk | Apr. 25, 1916 |
| 1,798,717 | Baranski | Mar. 31, 1931 |